US012348542B2

(12) United States Patent
Monnig et al.

(10) Patent No.: US 12,348,542 B2
(45) Date of Patent: Jul. 1, 2025

(54) TECHNIQUES FOR IDENTITY DATA CHARACTERIZATION FOR DATA PROTECTION

(71) Applicant: KOUNT INC., Boise, ID (US)

(72) Inventors: Nathan Daniel Monnig, Boise, ID (US); Joshua Michael Johnston, Boise, ID (US)

(73) Assignee: KOUNT INC., Boise, ID (US)

( * ) Notice: Subject to any disclaimer, the term of this patent is extended or adjusted under 35 U.S.C. 154(b) by 239 days.

(21) Appl. No.: 18/007,268

(22) PCT Filed: Jul. 29, 2021

(86) PCT No.: PCT/US2021/043782
§ 371 (c)(1),
(2) Date: Jan. 27, 2023

(87) PCT Pub. No.: WO2022/031523
PCT Pub. Date: Feb. 10, 2022

(65) Prior Publication Data
US 2023/0291756 A1    Sep. 14, 2023

Related U.S. Application Data

(60) Provisional application No. 63/060,366, filed on Aug. 3, 2020.

(51) Int. Cl.
*H04L 9/40* (2022.01)
(52) U.S. Cl.
CPC ........ *H04L 63/1425* (2013.01); *H04L 63/102* (2013.01); *H04L 63/105* (2013.01)

(58) Field of Classification Search
CPC .. H04L 63/1425; H04L 63/102; H04L 63/105
See application file for complete search history.

(56) References Cited

U.S. PATENT DOCUMENTS

| 9,516,053 B1* | 12/2016 | Muddu | G06F 16/9024 |
| 2008/0181503 A1* | 7/2008 | Schclar | G06V 10/28 |
| | | | 382/181 |

(Continued)

OTHER PUBLICATIONS

PCT/US2021/043782, "International Search Report and Written Opinion", Nov. 4, 2021, 14 pages.

(Continued)

*Primary Examiner* — J. Brant Murphy
(74) *Attorney, Agent, or Firm* — Kilpatrick Townsend & Stockton LLP

(57) ABSTRACT

Certain aspects involve a system, computer-implemented method, and computer-readable medium for identifying attributes associated with a target entity such as a person. A hierarchical characterization system receives an attribute and a request for associated identity data. The system generates an identity graph that includes attribute nodes corresponding to respective attributes and online interaction nodes corresponding to respective online interactions. The system correlates at least a subset of the online interactions and at least a subset of the attributes with a particular entity. The system generates a report indicating an identity of the entity and a behavior of the entity based on the correlated online interactions and the correlated attributes.

19 Claims, 9 Drawing Sheets

(56) References Cited

U.S. PATENT DOCUMENTS

| | | | |
|---|---|---|---|
| 2018/0248902 A1* | 8/2018 | Dănilă-Dumitrescu | H04L 67/535 |
| 2019/0089711 A1* | 3/2019 | Faulkner | H04L 63/1433 |
| 2019/0132224 A1* | 5/2019 | Verma | G06F 18/24 |
| 2021/0099475 A1* | 4/2021 | Eshghi | H04L 67/06 |
| 2022/0060507 A1* | 2/2022 | Crabtree | H04L 67/14 |
| 2022/0400130 A1* | 12/2022 | Kapoor | H04L 63/10 |

OTHER PUBLICATIONS

Smith, et al., "Identity System Essentials", Available online at: https://www.evernym.com/wp-content/uploads/2017/02/Identity-System-Essentials.pdf, Mar. 29, 2016, 16 pages.

Kelner, "Lazy Random Walks" in MIT Open Courseware, Topics in Theoretical Computer Science, Lecture 4 (2009)).

\* cited by examiner

| INTERACTION | ADDRESS | EMAIL | NAME | PHONE | PAYMENT | DEVICE | PPR | LOG(PPR) |
|---|---|---|---|---|---|---|---|---|
| T_01 | A_1 | E_1 | N_1 | P_1 | C_1 | | 0.02467 | -1.61 |
| T_02 | A_2 | E_1 | N_2 | P_1 | C_1 | | 0.02737 | -1.56 |
| T_03 | A_2 | E_1 | N_2 | P_1 | C_1 | | 0.02737 | -1.56 |
| T_04 | A_3 | E_1 | N_2 | P_1 | C_1 | | 0.03057 | -1.51 |
| T_05 | A_3 | E_1 | N_2 | P_1 | C_2 | | 0.02415 | -1.62 |
| T_06 | A_3 | E_1 | N_2 | P_1 | C_1 | D_1 | 0.03272 | -1.49 |
| T_07 | A_3 | E_1 | N_2 | P_1 | C_3 | D_2 | 0.03309 | -1.48 |
| T_08 | A_3 | E_1 | N_2 | P_1 | C_3 | | 0.03091 | -1.51 |
| T_09 | A_3 | E_1 | N_2 | P_1 | C_4 | D_3 | 0.03048 | -1.52 |
| T_10 | A_4 | E_1 | N_2 | P_1 | C_5 | D_4 | 0.03003 | -1.52 |
| T_11 | A_5 | E_1 | N_2 | P_1 | C_6 | D_4 | 0.03122 | -1.51 |
| T_12 | A_5 | E_1 | N_2 | P_1 | C_7 | D_5 | 0.031 | -1.51 |
| T_13 | A_5 | E_1 | N_2 | P_1 | C_7 | D_6 | 0.031 | -1.51 |
| T_14 | A_1 | E_2 | N_1 | P_2 | C_8 | | 0.00688 | -2.16 |
| T_15 | A_2 | E_3 | N_4 | P_2 | C_1 | | 0.00226 | -2.65 |
| T_16 | A_2 | E_3 | N_5 | P_1 | C_2 | | 0.01021 | -1.99 |
| T_17 | A_2 | E_3 | N_4 | P_2 | C_2 | | 0.00237 | -2.62 |
| T_18 | A_6 | E_3 | N_7 | P_2 | C_2 | | 0.00198 | -2.70 |
| T_19 | A_2 | E_3 | N_7 | P_2 | C_2 | | 0.00173 | -2.76 |
| T_20 | A_2 | E_3 | N_7 | P_2 | C_2 | | 0.00173 | -2.76 |
| T_21 | | | | | | | 0.00149 | -2.83 |
| T_22 | | E_3 | N_7 | P_2 | C_10 | D_8 | 0.00093 | -3.03 |
| T_23 | | E_3 | N_7 | P_2 | C_2 | D_9 | 0.0014 | -2.85 |
| T_24 | | E_3 | N_7 | P_2 | C_2 | D_9 | 0.0014 | -2.85 |
| T_25 | | E_3 | N_7 | P_2 | C_2 | D_9 | 0.0014 | -2.85 |
| T_26 | | E_3 | N_7 | P_2 | C_2 | D_9 | 0.0014 | -2.85 |

FIG. 7

TECHNIQUES FOR IDENTITY DATA CHARACTERIZATION FOR DATA PROTECTION

CROSS-REFERENCE TO RELATED APPLICATIONS

This application claims the benefit and priority under 35 U.S.C. 119(e) of U.S. Provisional Application No. 63/060,366, filed Aug. 3, 2020 the contents of which is herein incorporated by reference in its entirety for all purposes.

TECHNICAL FIELD

The present disclosure relates generally to computer security. More specifically, but not by way of limitation, this disclosure relates to generating an identity graph associated with an entity for determining an identity or behavior of the entity, which can then be used to prevent data tampering and protect sensitive data.

BACKGROUND

Various systems may track or otherwise use identity-related information associated with one or more entities. Such information may be analyzed to identify potential malicious actors and prevent unauthorized access to computing resources. For example, a system may identify a name or an email address of an individual that accessed a Web site to identify that individual. As another example, a system may use identity information to determine whether one or more interactions are associated with suspicious activity (e.g., if an online interaction was performed by a user or Internet Protocol (IP) address associated with a certain risk level). But, determining the identity information may be difficult to achieve. For example, the identity of an entity may be determined based on attributes of interactions that are associated with the entity. The attributes may not be unique with respect to the entity, and multiple entities may be associated with multiple attributes. It can be challenging and time-consuming to accurately determine such identity information using non-unique or semi-unique attributes of interactions associated with one or more entities.

SUMMARY

Certain aspects involve characterizing identity data for data protection. For example, a computer-implemented method comprises receiving, by a computing system from a computing device, a first attribute and a request for associated identity data. The computer-implemented method comprises generating, by the computing system and in response to the request, an identity graph comprising a plurality of attribute nodes corresponding to a respective plurality of attributes and a plurality of online interaction nodes corresponding to a respective plurality of online interactions. The attribute nodes include an attribute node corresponding to the first attribute. The computer-implemented method comprises correlating, by the computing system and based on the identity graph, at least a subset of the plurality of online interactions and at least a subset of the plurality of attributes with a particular entity. The computer-implemented method comprises generating, by the computing system based on the correlated online interactions and the correlated attributes, a report indicating an identity of the entity and a behavior of the entity.

In some aspects, the computer-implemented method further comprises providing, in response to the request for the identity data, the report to the computing device as output.

In some aspects, the computer-implemented method further comprises executing, based on the correlated online interactions and the correlated attributes, an action to prevent the entity from accessing a computing resource. In some aspects, the correlating comprises executing a diffusion process on the identity graph to compute a probability distribution for each of the online interactions. In some aspects, the diffusion process comprises one or more of: personalized page rank, restricted personalized page rank, random walks with restarts, a variant of belief propagation, or lazy random walks. In some aspects, the identity graph comprises a bipartite graph.

In some aspects, the entity is a first entity, and wherein generating the report indicating the identity and the behavior of the first entity includes determining an identity and a behavior of a second entity that is associated with the first entity. In some aspects, the computer-implemented method further comprises determining one or more projections of future behavior associated with the first entity and the second entity. In some aspects, each attribute semi-uniquely identifies the entity.

In some aspects, generating the report indicating the identity and the behavior of the entity includes inferring a set of historical events associated with the entity, wherein the set of historical events includes one or more online interactions, and generating the report indicating the identity and the behavior of the entity includes determining whether the set of historical events includes an anomaly.

In some aspects, a system comprises a processor and a non-transitory computer-readable medium comprising instructions that are executable by the processor to cause the processor to perform operations comprising receiving, by a computing system from a computing device, a first attribute and a request for associated identity data. The operations comprise generating, by the computing system and in response to the request, an identity graph comprising a plurality of attribute nodes corresponding to a respective plurality of attributes and a plurality of online interaction nodes corresponding to a respective plurality of online interactions. The attribute nodes include an attribute node corresponding to the first attribute. The operations comprise correlating, by the computing system and based on the identity graph, at least a subset of the plurality of online interactions and at least a subset the plurality of attributes with a particular entity. The operations comprise generating, by the computing system based on the correlated online interactions and the correlated attributes, a report indicating an identity of the entity and a behavior of the entity.

In some aspects, a non-transitory computer-readable storage medium comprises program code that is executable by a processor device to cause a computing device to perform operations. The operations comprise receiving, by a computing system from a computing device, a first attribute and a request for associated identity data. The operations comprise generating, by the computing system and in response to the request, an identity graph comprising a plurality of attribute nodes corresponding to a respective plurality of attributes and a plurality of online interaction nodes corresponding to a respective plurality of online interactions, the attribute nodes including an attribute node corresponding to the first attribute. The operations comprise correlating, by the computing system and based on the identity graph, at least a subset of the plurality of online interactions and at least a subset the plurality of attributes with a particular entity. The operations comprise generating, by the computing system based on the correlated online interactions and the correlated attributes, a report indicating an identity of the entity and a behavior of the entity.

Various embodiments are described herein, including methods, systems, non-transitory computer-readable storage media storing programs, code, or instructions executable by one or more processors, and the like.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

FIG. 7 is a table of online interactions and associated probabilities with respect to a diffusion algorithm performed by a hierarchical characterization system according to one example of the present disclosure.

DETAILED DESCRIPTION

Figure 1:
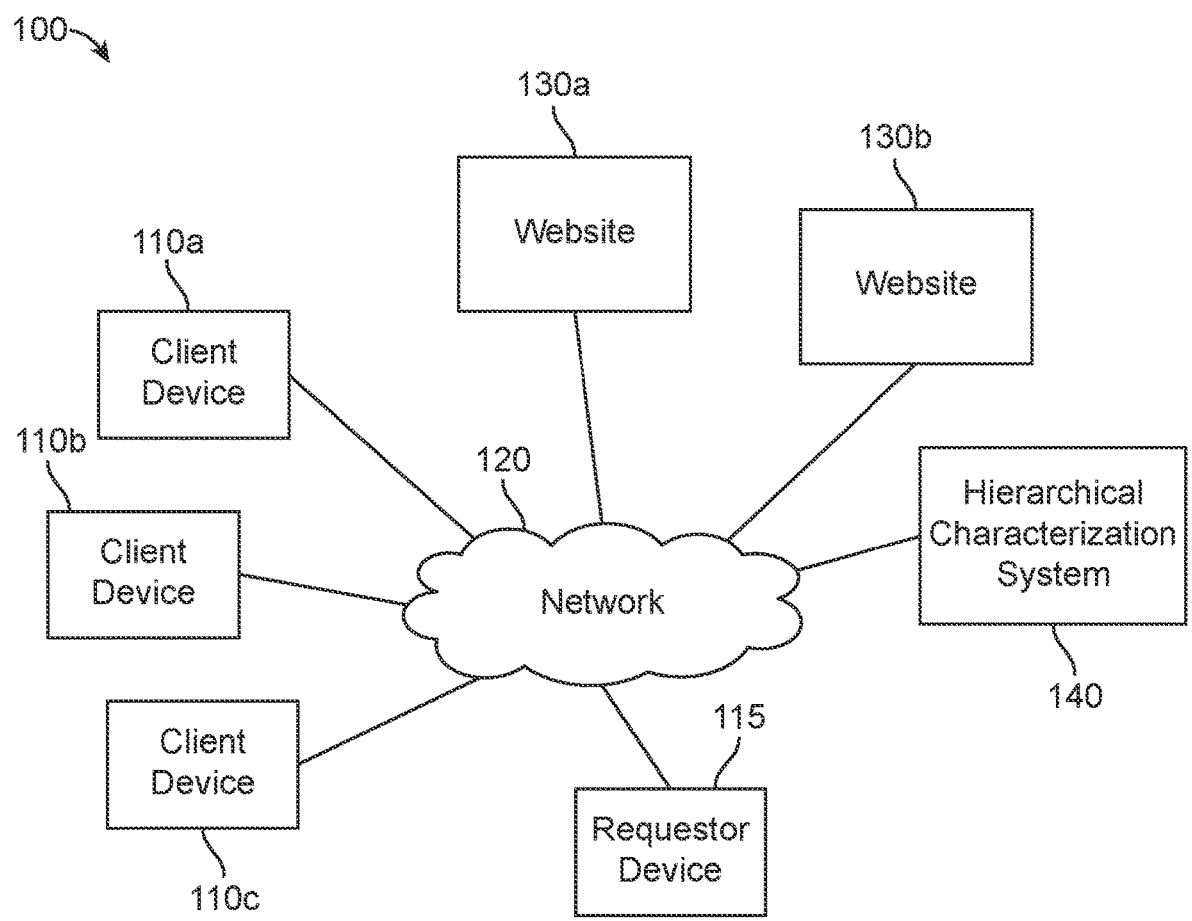
FIG. 1 is a block diagram of a system environment for a hierarchical characterization system according to one example of the present disclosure.

Certain aspects and features of the present disclosure relate to generating an identity graph for determining an identity or a behavior associated with an entity based on interactions. The entity can be an individual or other suitable type of entity that can perform online interactions. In some examples, the entity can be a user of a computing system or device.

Characterization of the physical and digital identity of individual entities is increasingly desirable. It is beneficial to answer difficult questions about an entity (e.g., an individual or organization). For example, the questions may pertain to determining an entity's primary email address, phone number, where the entity currently lives, what other addresses the entity has inhabited in the past, what devices the entity normally uses, the entity's dominant methods of payment, the entity's typical spending patterns, whether the entity has previously visited a particular platform and in what capacity, and so forth. Further, it is desirable to anticipate the entity's behavior (e.g. whether they are likely to be high-value customer, commit promotional abuse, or third-party fraud, and whether there is anything anomalous and/or suspicious about this entity's identity (e.g. utilization of a very large number of payment methods). Identifying such patterns of suspicious behavior can be used to identify entities likely to perform risky behaviors such as data tampering or fraud, and prevent such behaviors.

When an entity performs online interactions, such as a login attempt, a social media post, an account creation, a financial transaction, or other suitable type of interaction that can be performed with respect to an online environment, valuable data associated with the entity can be obtained, such as an email address, phone number, payment account information, physical address, social security number, and so forth. This data collected with each online interaction can be used to infer information about the entity. For example, when interaction data for an online interaction includes a phone number and an email address, in many cases, a system can correctly infer the existence of an entity who uses both that phone number and email address. This inference can be extended across linked transactions to develop a complete characterization of an entity's physical and digital identity overtime.

Two primary factors complicate the inference problem. Entities have non-unique association with identity elements (i.e., one entity may utilize multiple names, emails, phones, physical addresses, payment methods, or devices). Moreover, identity elements have non-unique association with entities (i.e. the same name, email address, phone number, physical address, payment method, or device may be legitimately used by multiple entities. These distinct entities may share any degree of relationship, from the very close relationship between spouses who live together, to no meaningful relationship whatsoever in the case of two unrelated people who share the same name.

The first factor implies that transitive relationships may link pieces of an individual user's identity footprint. The second factor implies that transitive relationships may link different users' identities together. These competing factors must be carefully addressed in order to accurately characterize the full identity of an individual entity, without aggregating in other entities.

As a result, prior systems for analyzing online interaction data for association with entities are not robust to identity attributes with non-unique associations with entities (e.g. shared addresses). To manage this shortcoming, in some systems, a list of exclusions must be manually curated. This mitigation strategy is both labor intensive and highly imprecise. The connected components grow very large over time, aggregating together many unrelated entities. To manage this shortcoming, in some systems, only a short history of recent transactions is maintained in the linked analysis. This mitigation strategy severely limits the quantity of useful historical data which is retrieved for most entities.

Moreover, due to the vast amount of data associated with online interactions, as well as the difficulty in correctly characterizing data that may be non-uniquely associated with a particular entity, it is generally time-consuming and computationally expensive to attempt to traverse online interaction data to infer identity information associated with a particular entity. Commonly such analysis can take hours or even days and cannot be feasibly performed in real-time or on-the-fly. Such limitations on how quickly risky entities or behaviors can be identified can lead to increased opportunities for malicious actors to commit data tampering or fraud.

To solve these problems, in some embodiments, interaction data is gathered and used to generate a knowledge graph framework to facilitate the application of computationally efficient graph algorithms and support the extraction of useful auxiliary information from relevant vertices and edges. This approach can effectively leverage all the historical data without requiring manual exclusions. By carving out the set of online interactions (and identity attributes) associated with an individual user, the most relevant set of features and statistics can be extracted from the knowledge graph. This data extraction step supports the most comprehensive characterization of the user's true identity based on the available data.

In some implementations, online interaction data is used to generate a knowledge graph that includes nodes (also referred to as vertices) including attribute nodes and interaction nodes. The interaction nodes can correspond to interactions performed by one or more entities (e.g., an online interaction such as a login to a website, a social media post, an online transaction, etc.). The attribute nodes can correspond to attributes associated with the interactions. The attributes can include data associated with the interactions. For example, the attributes can include an email address, a physical address, a phone number, a name, a device identifier, and an account associated with the interactions. The attributes can include semi-unique identifiers with respect to an entity. For example, more than one entity can share a name, an address, an email address, etc. A hierarchical characterization system can identify the entity by generating a report using the semi-unique identifiers that indicates the identity of the entity. In some examples, the report can include a behavior of the entity (e.g., an online interaction or pattern of online interactions associated with the entity), an identity of an additional entity (e.g., a family member sharing a same physical address or phone number), a behavior of the additional entity, other suitable information about the entity or the additional entity, or a combination thereof.

An online computing system or environment, such as a website, may allow one or more entities to perform one or more interactions. The interactions, in some examples, may include suspicious or otherwise anomalous interactions that may include security risks. For example, the interactions may include fraudulent interactions. A hierarchical characterization system can use an identity graph to determine an identity and a behavior for the entities. Additionally, the hierarchical characterization system can detect suspicious online activity or interactions using the identity graph. The hierarchical characterization system can increase a level of security associated with the online computing environment in response to determining or detecting suspicious online activity or interactions. In some examples, increasing the level of security may involve requesting two-factor or multi-factor authentication information from an entity associated with the suspicious online activity or interactions. In addition to increasing security of the online computing system or environment, the hierarchical characterization system can be used to detect fraudulent online interactions, to perform targeted marketing tasks with respect to entities based on behavior and historical interactions of the entities, and to perform other suitable tasks.

The hierarchical characterization system can infer an identity and behavior of an entity, such as a user of a computing device, by analyzing a network of historical events linked by shared attributes using a local diffusion process algorithm. The historical events can include interactions. The entity may be associated with different values for an attribute (e.g. have multiple email addresses), and various entities may share an attribute, such as a name, an address, or other suitable attribute. The hierarchical characterization system can use a knowledge graph framework to identify a set of interactions associated with the entity.

The hierarchical characterization system can use interaction data to provide identity information about large numbers of entities. The data collected in connection with each interaction can support inferences about identities and behaviors of one or more entities. For example, when an interaction includes a phone number and an email address, the hierarchical characterization system may infer the existence of an entity that uses the phone number and the email address. The inferences can be extended across linked interactions for developing a characterization of a physical and digital identity over time of one or more entities.

The hierarchical characterization system can transform the interaction data into a knowledge graph framework to facilitate the application of computationally efficient graph algorithms and to support the extraction of useful auxiliary information from relevant vertices and edges of the knowledge graph framework. The hierarchical characterization system can maintain interaction events and identity attributes observed with associated interactions as two vertex types in the knowledge graph framework. Edges of the knowledge graph can be extended between each interaction event vertex and associated identity attributes. The knowledge graph representation can include a data footprint that can grow linearly with respect to an amount of stored identity attributes and to an amount of observed interaction events. The knowledge graph framework can support attachment of relevant attributes of each vertex such as a device operating system or other suitable relevant attributes. The knowledge graph can be stored in a low-latency graph database, which can support rapid graph traversals and rapid extraction of information.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Example of a Computing Environment for Implementing Certain Aspects

Referring now to the drawings, FIG. 1 is a block diagram of a system environment 100 for a hierarchical characterization system 140 according to one example of the present disclosure. The system environment 100 can include one or more client devices 110a, 110b, and 110c, a requestor device 115, a network 120, one or more websites 130a and 130b, and the hierarchical characterization system 140. In some examples, different or additional components may be included in the system environment 100.

The client devices 110a-110c can include one or more computing devices capable of receiving input, such as user input, as well as transmitting data, receiving data, or a combination thereof via the network 120. In some examples, the client devices 110a-110c can be computers or computing systems, such as a desktop or a laptop computer. Alternatively, the client devices 110 may include one or more devices having computer functionality such as a personal digital assistant (PDA), a mobile telephone, a smartphone, or other suitable computing device. The client devices 110 can be configured to communicate via the network 120. In some examples, the client devices 110a-110c can execute an application allowing a user or other entity associated with the client devices 110a-110c to interact with the websites 130. For example, the client devices 110a-110c can execute a browser application to enable interaction between the client devices 110a-110c and the websites 130 via the network 120. In another example, the client devices 110a-110c can interact with the websites 130a-130b through an application programming interface (API) running on a native operating system of the client devices 110, such as IOS® or ANDROID™, or other suitable operating system.

The client devices 110a-110c, websites 130a-130b, requestor device 115, and hierarchical characterization system 140 can be configured to communicate via the network 120, which may include any combination of local area networks, wide area networks, or a combination thereof, using wired communication systems, wireless communication systems, or a combination thereof. In some examples, the network 120 can use standard communications technologies or protocols. For example, the network 120 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 may include multiprotocol label switching (MPLS), transmission control protocol/Internet protocol (TCP/IP), hypertext transport protocol (HTTP), simple mail transfer protocol (SMTP), file transfer protocol (FTP), and the like. Data exchanged over the network 120 may be represented using formats such as hypertext markup language (HTML), extensible markup language (XML), or other suitable format. In some examples, all or some of the communication links of the network 120 may be encrypted using any suitable technique or techniques.

The requestor device 115 can include one or more computing devices capable of receiving input, such as user input, as well as transmitting data, receiving data, or a combination thereof via the network 120. In some examples, the requestor device 115 can be a computer or computing system, such as a server computer, desktop computer, or a laptop computer. In some examples, the requestor device 115 is associated with a requesting entity. The requestor device 115 transmit a request to the hierarchical characterization system 140 to request information relating to online interactions with respect to the websites 130a-130b via the network 120.

One or more websites 130a, 130b may be communicatively coupled to the network 120 for communicating with the hierarchical characterization system 140, which is further described below in conjunction with FIG. 2. In some examples, the websites 130a, 130b can include an application provider communicating information describing applications for execution by the client devices 110 or communicating data to the client devices 110 for use by an application executing on the client devices 110. In some examples, the websites 130a, 130b can be operated by a social media service, blog, merchant, or other suitable website operational entity, and can provide a graphical user interface for entities associated with the website operational entity to conduct interactions with the merchant using a client device (e.g., client devices 110a-110c).

In some examples, the websites 130a, 130b can provide content or other information for presentation via the client devices 110a-110c. The websites 130a, 130b can communicate information to the hierarchical characterization system 140 describing interactions between the websites 130a, 130b and the client devices 110.

The websites 130a, 130b may include or be associated a web server that can link the websites 130a, 130b via the network 120 to the one or more client devices 110, as well as to the hierarchical characterization system 140. The web server can serve web pages, as well as other content such as JAVA®, FLASH®, XML, and the like. The web server may receive and route messages between the websites 130a, 130b, the hierarchical characterization system 140, and the client devices 110a-110c. Additionally, the web server may provide application programming interface (API) functionality to send data directly to native client device operating systems, such as IOS®, ANDROID™, BlackberryOS, etc.

Figure 2:
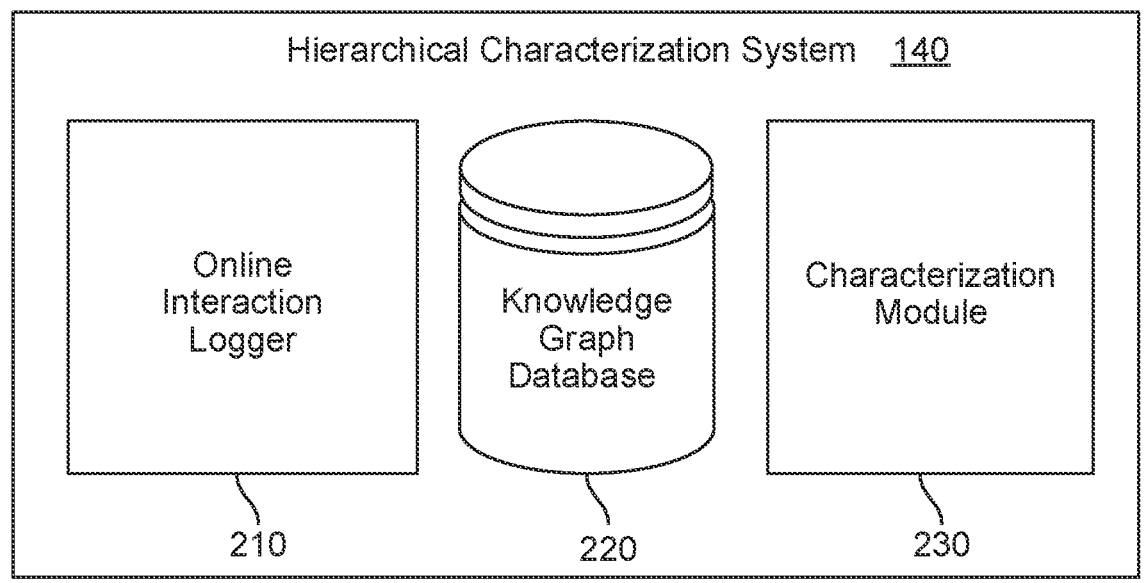
FIG. 2 is a block diagram of an architecture of the hierarchical characterization system according to one example of the present disclosure.

FIG. 2 is a block diagram of an architecture of the hierarchical characterization system 140 according to one example of the present disclosure. The hierarchical characterization system 140 can include an online interaction logger 210, a knowledge graph database 220, and a characterization module 230. The hierarchical characterization system 140 may include additional, fewer, or different components for various applications. Some components, such as network interfaces, security functions, load balancers, failover servers, management and network operations consoles, and the like, are not shown so as to not obscure the details of the system architecture.

The online interaction logger 210 can be configured to receive interaction attributes from the websites 130a-130b or from other suitable sources. For example, each time one or more client devices 110a-110c interacts with one or more websites 130a-130b, the hierarchical characterization system 140 can receive interaction attributes associated with the interaction. The interactions may include a login attempt, a lost password request, a purchase of an item or service, an account creation attempt, some other interaction between the client devices 110a-110c and the websites 130a-130b, or some combination thereof. The interaction attributes may include an IP address, a time stamp, an email address, a phone number, a physical address, a user ID, network attributes associated with the interaction, device characteristics of the client device 110a, 110b, or 110c, behavioral characteristics of an entity associated with the client device 110a, 110b, and/or 110c, a merchant ID, items purchased, or a combination thereof. The online interaction logger 210 can receive interaction attributes from the website 130 or from other suitable sources. The online interaction logger 210 can be configured to store the interaction attributes in the knowledge graph database 220. Additionally, actions an entity performs via an application associated with a website 130a and/or 130b and executing on a client device 110a, 110b, and/or 110c may be communicated to the online interaction logger 210 by the application for recordation in the knowledge graph database 220.

The knowledge graph database 220 can include one or more databases configured to store interaction data. The interaction data can include interaction attributes for interactions conducted with the websites 130a and/or 130b. The interaction attributes may be received from the online interaction logger 210. The interaction data may include a fraud attribute or other similar attribute relating to suspicious online activity. The fraud attribute may indicate whether the interaction was determined to be a fraudulent or otherwise suspicious interaction. The fraud attribute may be created at the time of the creation of the interaction attributes. In some examples, the fraud attribute may be added to previously stored interaction data to indicate that an interaction was determined to be fraudulent or suspicious after the fact. The knowledge graph database 220 may be used by the hierarchical characterization system 140 to track entity actions with respect to the hierarchical characterization system 140 and with respect to actions on websites 130 that communicate with the hierarchical characterization system 140.

The knowledge graph database 220 may additionally store entity actions taken on a website (e.g., websites 130*a* and 130*b*), such as an external website, and communicated to the hierarchical characterization system 140. For example, an e-commerce website may recognize an entity associated with the hierarchical characterization system 140 through a social plug-in enabling the e-commerce website to identify the entity.

The hierarchical characterization system can be configured to generate a bipartite graph and store the bipartite graph to the knowledge graph database 220. The bipartite graph can include interaction nodes and attribute nodes. The bipartite graph can additionally include other suitable types of nodes. Each interaction node can represent an online interaction such as a login event, transaction, blog or social media post, etc. Each attribute node can represent an attribute for an associated interaction. The attribute nodes can be linked to one or more interaction nodes, as further described with reference to FIGS. 3-4 and 6.

The characterization module 230 can be configured to extract identity information from the data stored in the knowledge graph database 220. For example, the characterization module 230 may execute an algorithm, such as a Restricted Personal PageRank (RPPR) algorithm, to identify hierarchies of identities associated with interactions and interaction attributes in the knowledge graph database 220. The characterization module 230 may additionally generate reports describing entity characteristics based on the data stored in the knowledge graph database 220. The functions of the characterization module 230 are further described below with respect to FIG. 6.

Figure 3:
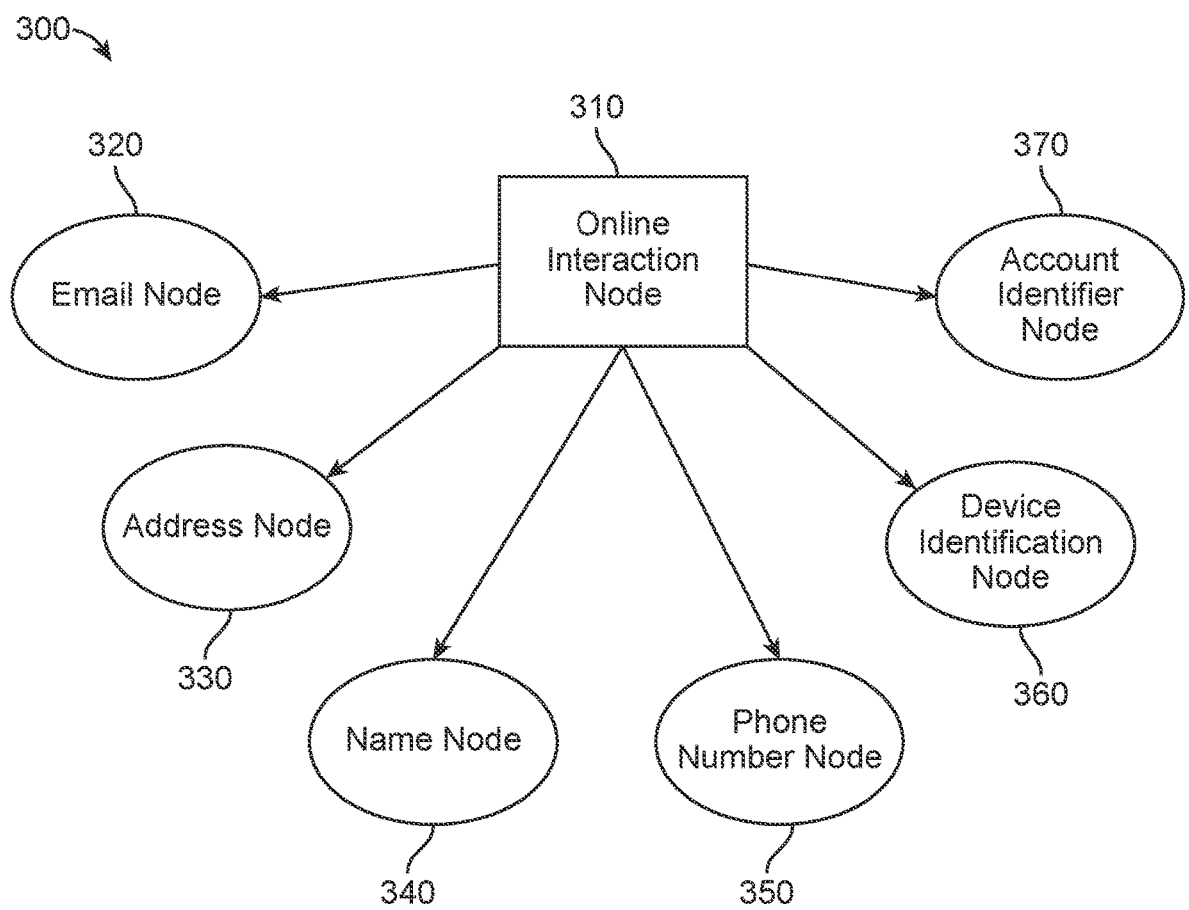
FIG. 3 is a design schematic for an identity graph according to one example of the present disclosure.

FIG. 3 is a design schematic for an identity graph 300 according to one example of the present disclosure. The identity graph 300 can include an online interaction node 310. The online interaction node 310 can be connected to attribute nodes 320-370 via edges. The attributes nodes include as an email node 320, an address node 330, a name node 340, a phone number node 350, a device identification node 360, and an account identifier node 370. Other suitable interaction and attribute nodes can be included in the identity graph 300.

The identity graph 300 can store information associated with each node. The online interaction node 310 may include a website name, a website identifier (e.g., a merchant identifier), an interaction date, whether the interaction was completed, and other suitable information. In some implementations, the online interaction node 310 may indicate whether the interaction was determined to be fraudulent or otherwise suspicious (e.g., a risk score may be stored in association with the online interaction node 310). The email node 320 may include an email address that was used with respect to the interaction. The address node 330 may include a billing address, shipping address, or other suitable physical address that was used with respect to the interaction. The name node 340 may include a name used to set up an account, a billing name, a shipping name, or other suitable type of name, used with respect to the interaction, for an entity. The phone number node 350 may include an entity phone number that was used with respect to the interaction. The device identification node 360 may include a device identifier that is unique to the device, an operating system a browser, a region, an IP address, any other device characteristic, or a combination thereof, used with respect to the interaction. The account identifier node 370 may include a subset of the billing information, or other suitable account information for identifying an account associated with the entity, used for the interaction such as first four numbers or last four numbers of a credit card or tokenized version thereof.

The edges of the identity graph 300 may describe a relationship between the online interaction node 310 and the connected attribute nodes. For example, the edge may indicate that the phone number stored with the phone number node 350 was obtained from an input field for the interaction represented by the online interaction node 310. The edge may indicate that the interaction was associated with another attribute based on information collected by another service, for example in the case of a device fingerprint stored in the device identification node 360. In some examples, the edge may indicate whether the interaction was approved or whether the interaction was determined to be fraudulent or otherwise suspicious.

Figure 4:
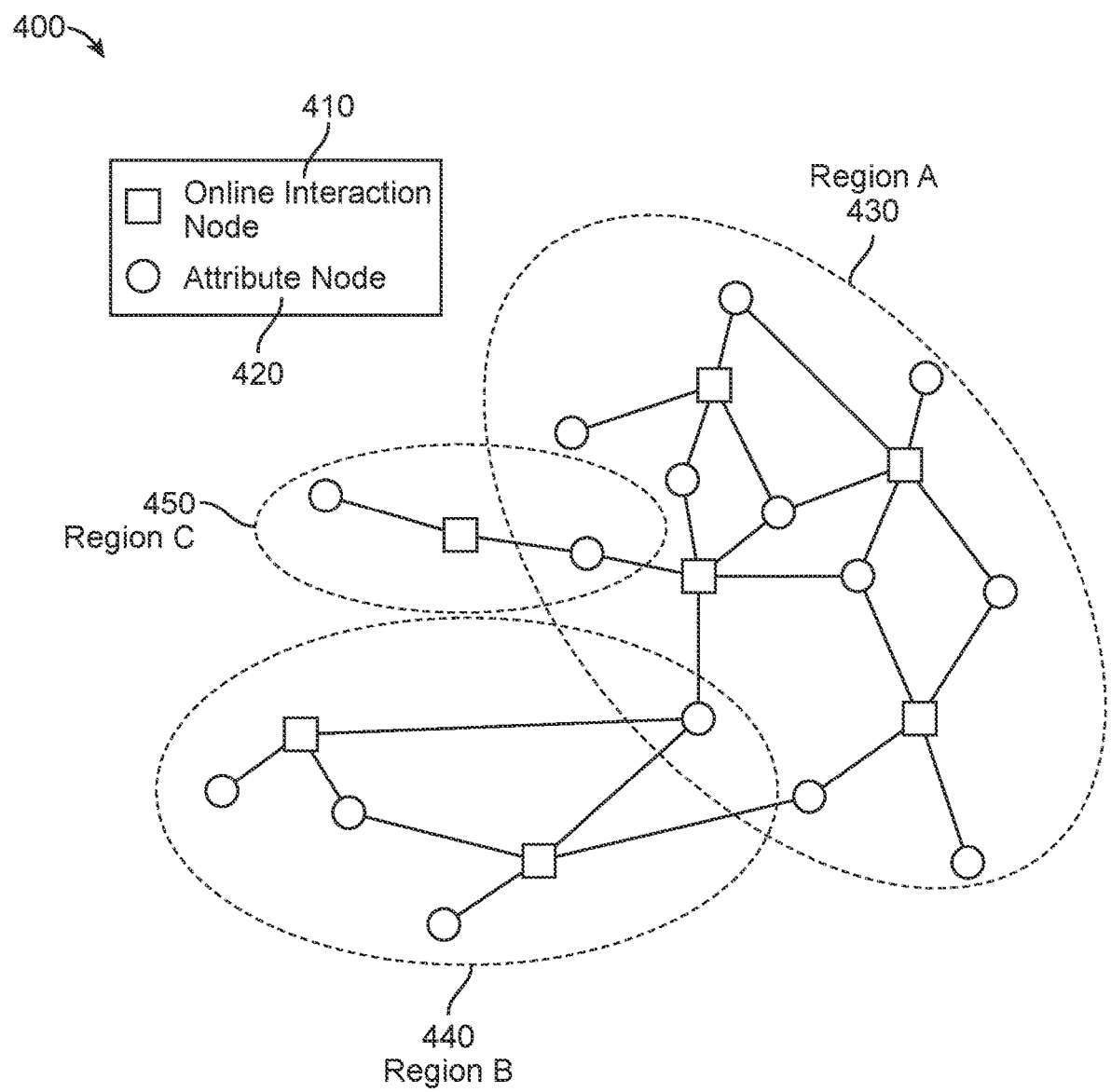
FIG. 4 is an identity graph linked to interactions associated with an entity to one example of the present disclosure

FIG. 4 is an example of an identity graph 400 linked to interactions associated with an entity according to one example of the present disclosure. The identity graph 400 can be a bipartite graph that includes online interaction nodes 410 and attribute nodes 420. The identity graph 400 can additionally or alternatively include other suitable types of nodes.

Each online interaction node 410 can represent an interaction. The interaction may be, for example, a login event, a social media post, or an online purchase of a good or service. Each online interaction node 410 can be linked to one or more attribute nodes 420. Each attribute node 420 can be linked to one or more online interaction nodes 410. Each attribute node 420 can represent an attribute for a linked interaction, such as an IP address, a time stamp, an email address, a phone number, a physical address, a user ID, network attributes of the interaction, device characteristics, behavioral characteristics, a merchant ID, items purchased, a transaction amount, a combination thereof, or other suitable interaction attribute.

The identity graph 400 can include three regions: region A 430, region B 440, and region C 450. The identity graph 400 can include other suitable amounts of regions (e.g., fewer than three, greater than three, etc.). The interactions represented in region A 430 can be interactions in the identity graph 400 that were identified, using the techniques described herein, as being associated with a particular entity, Entity A. The interactions represented in region B 440 can be interactions that were identified, using the techniques described herein, as being associated with another entity, Entity B. Entity B may be an associated entity, for example a spouse of Entity A, and there may be some overlap of attributes between such associated entities. The interactions represented in region C 450 can be interactions that were conducted by a non-associated entity but are connected by an attribute node to the interactions of the entity (e.g., an unrelated person that at one point had the same address, phone number, etc. as Entity A). The algorithms used to determine whether an interaction was conducted by the entity are further described with reference to FIGS. 5-6.

Figure 5:
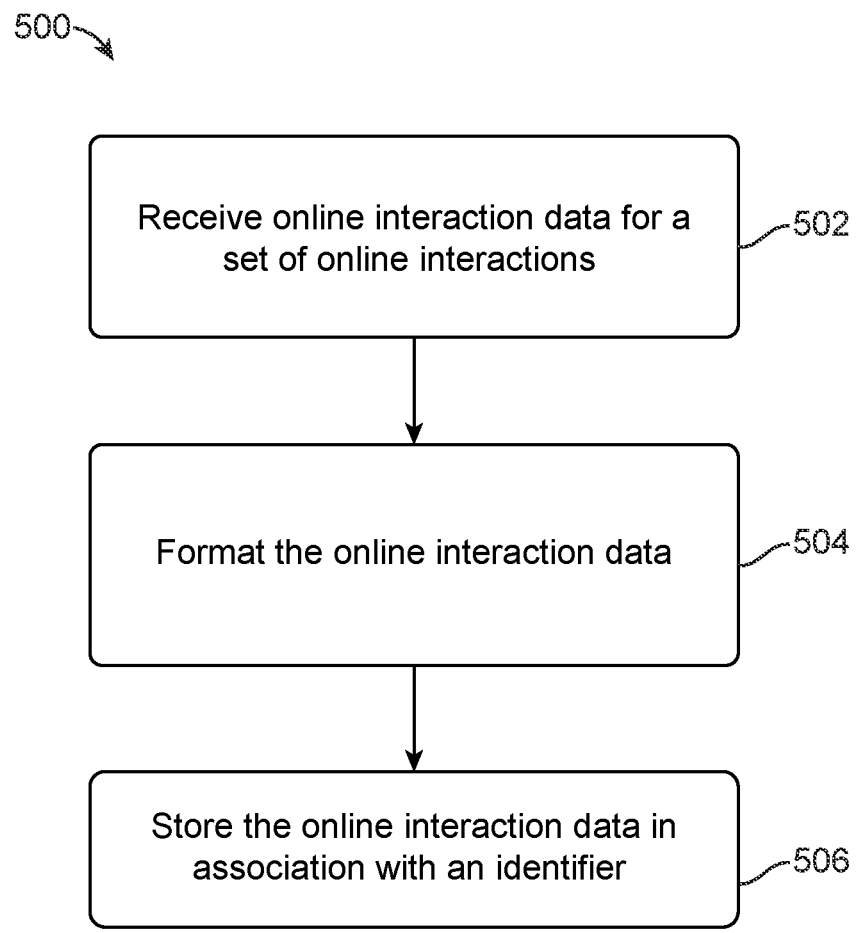
FIG. 5 is a flow chart of a process to ingest and store online interaction data for use in generating an identity graph according to one example of the present disclosure

FIG. 5 is a flow chart of a process 500 for ingesting and storing online interaction data for use in generating the identity graph 400 according to one example of the present disclosure. The process 500 may be performed by components of an online system (e.g., hierarchical characterization system 140). Other entities may perform some or all of the steps in FIG. 5 in other examples. Examples may include different or additional steps or perform the steps in varying orders.

At block 502, the hierarchical characterization system receives online interaction data for a set of online interactions. For example, an application programming interface (API) can exist between, or otherwise connect, one or more websites 130 and the hierarchical characterization system 140. The API can allow the hierarchical characterization system 140 to continuously, in some examples in substantially real-time, update a database, such as the knowledge graph database 220, as the online interactions occur.

When a given online interaction occurs, the hierarchical characterization system receives associated data (e.g., via an API or other network communication). The online interactions can be associated various types of data. For example, the data can include a name, a street address, one or more device identifiers, a session identifier, an email address, and other suitable types of online interaction data. The online interaction data can include physical data and/or digital data. Physical data can include information relating to the physical world. For example, the physical data can include a street address, a name, and other suitable types of physical data. Digital data can include information relating to digital entities. For example, the digital data can include a device identifier, an email address, and other suitable types of digital data.

At block 504, the hierarchical characterization system 140 formats the online interaction data. The hierarchical characterization system 140 can standardize one or more pieces of physical data, can tokenize one or more pieces of digital data, or a combination thereof. For example, the hierarchical characterization system 140 can standardize a street address associated with the online interactions and can tokenize sensitive data such as financial account information. The hierarchical characterization system 140 can perform other suitable formatting operations.

At block 506, the hierarchical characterization system 140 stores the online interaction data in association with an identifier. In some embodiments, each piece of data of the online interaction data can be associated with an identifier such as a session identifier, a device identifier, or other suitable type of identifier. The hierarchical characterization system can store the online interaction data and can associate the online interaction data with corresponding identifiers such that the online interaction data is available to be retrieved for use in other operations.

Techniques for Hierarchical Characterization of Digital Identity

Figure 6:
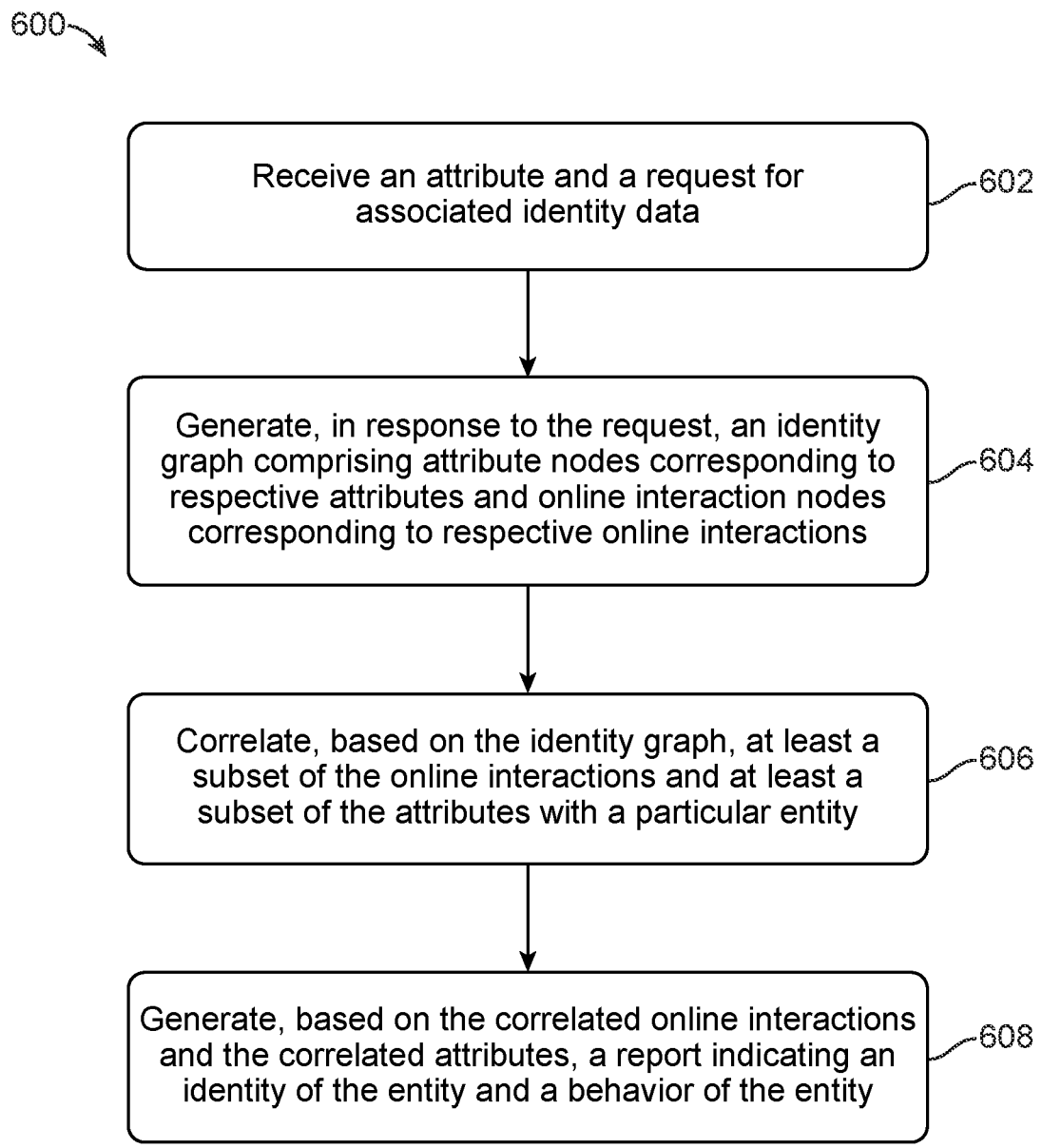
FIG. 6 is a flow chart of a process to generate a report indicating an identity of an entity according to one example of the present disclosure.

FIG. 6 is a flowchart of a process 600 for hierarchical characterization of a digital identity according to one examples of the present disclosure. The process 600 may be performed by components of an online system (e.g., hierarchical characterization system 140). Other entities may perform some or all of the steps in FIG. 6 in other examples. Examples may include different or additional steps or perform the steps in varying orders.

At block 602, the hierarchical characterization system receives an attribute and a request for associated identity data. For example, the hierarchical characterization system receives the request from the requestor device 115 depicted in FIG. 1 over a network. Based on some known attribute, such as an email address, the hierarchical characterization system may receive a request for additional information indicative of an identity of the person. For example, the requestor device 115 requests information such as a name of a person associated with a known email address, a physical address associated with a user name, and so forth. In some examples, the hierarchical characterization system receives the attribute and the request in substantially real-time and may perform one or more operations on-call in which the hierarchical characterization system can perform the operations quickly or otherwise nearly instantaneously.

The attribute may be some known attribute available to the requesting entity. For example, the attribute can include an email address, a phone number, account details associated with an online interaction, a physical address, and so forth. The attribute may be associated with one or more online or in-person interactions performed by a particular entity.

The associated identity data can include additional attributes associated with an entity linked to the received attribute. For example, a given email address belongs to a certain person, who also has a physical address, phone number, a set of user names, a set of credit card numbers, etc. The additional attributes may include additional attributes associated with a particular interaction, additional interactions associated with the known attribute, other suitable identity data, or a combination thereof.

At block 604, the hierarchical characterization system generates an identity graph comprising attribute nodes corresponding to respective attributes and online interaction nodes corresponding to respective online interactions. The identity graph may be similar to the identity graphs 300 and 400 described above with respect to FIGS. 3 and 4. The identity graph can include nodes corresponding to multiple different attributes that have some connection to the attribute received at block 602. In some implementations, the hierarchical characterization system uses the data that is ingested and stored as described above with respect to the process 500 of FIG. 5 to generate the identity graph.

The hierarchical system may build the identity graph by extending edges between the nodes corresponding to different attributes. In some implementations, the hierarchical characterization system identifies an online interaction node, corresponding to an online interaction such as a login event, purchase, social media post, etc. The hierarchical characterization system generates an edge between each interaction event node and each of set of associated identity attributes. In an example in which the interaction event node is associated with an email node, a name node, and an account node, the hierarchical characterization system can use a first edge to connect the interaction event node with the email node, a second edge to connect the interaction event node and the name node, and a third edge to connect the interaction event node and the account node. More than one interaction event node can be connected to a single attribute node. For example, a second interaction event node can be associated with two attribute nodes: a phone number node and the name node described above. In this example, the hierarchical characterization system can use the second edge to connect the interaction event node and the name node and can use a fourth edge to connect the name node and the second interaction event node.

In some implementations, the hierarchical characterization system stores the identity graph in a low-latency database, which can support rapid graph traversals and extraction of information. The identity graph can include interaction events and the identity attributes observed with those interactions as two distinct vertex types in the identity graph. Thus, in some implementations, the identity graph is a bipartite graph, and the nodes of the identity graph can be divided into independent sets including the interaction nodes and attribute nodes.

In some embodiments, the identity graph G is composed of a set of vertices V, edges $E=\{e_{ij} \text{ for all } v_i \sim v_j\}$, and edge weights $W=\{w_{ij}>0 \text{ for all } e_{ij} \in E\}$. For example, referring to the example in FIG. 3, the vertices include the online interaction node, and the attribute nodes including email node, address node, etc. Each of these vertices are connected with edges, which may be assigned different weights.

At block 606, the hierarchical characterization system correlates at least a subset of the online interactions and at least a subset of the attributes with a particular entity. The correlation can be performed based on the identity graph. For example, the hierarchical characterization system executes a diffusion process (e.g., a diffusion algorithm) to identify an identity footprint of the entity in the identity graph. The identity footprint may include a set of interactions and attributes associated with the entity. For example, referring to FIG. 4, region A 430, region B 440, and region C 450 are three identity footprints, each associated with a different respective entity. The diffusion process may be applied to identify associations between vertices in the graph, and based on the strength of these associations, the vertices are associated with one entity or another. A diffusion process may be executed with one or more personalization vertices known to be included in the entity's footprint such as an email address, phone number, or device ID.

In some implementations, the diffusion algorithm includes a personalized PageRank (PPR) algorithm, such as a restricted personalized page rank (RPPR) algorithm. The PPR algorithm can be applied to an identity graph, or a subset thereof, to generate a probability distribution that can be used to identify one or more entities and associated interactions and attributes. In contrast, the RPPR algorithm allows an approximation to be used to generate the probability distribution. The RPPR algorithm may estimate or otherwise approximate a set of probabilities that may be directly calculated or otherwise determined by the PPR algorithm. The set of probabilities may include probabilities that are zero or essentially zero. With respect to the identity graph, probabilities that are zero or essentially zero may not be identified as the entity, so an approximation in this case can be appropriate.

Alternatively, or additionally, the diffusion algorithm may include a random walks with restarts process, a belief propagation process, a lazy random walk process (e.g., as described in Kelner, "Lazy Random Walks" in MIT Open Courseware, Topics in Theoretical Computer Science, Lecture 4 (2009)), another Markov Chain random walk or diffusion process algorithm, or some approximation thereof. A random walks with restarts algorithm may involve performing a random walk algorithm that includes a restart probability. The random walk algorithm may involve a stochastic process of moving between points on a graphical model. The restart probability can include a probability of returning back to an origin portion of the graphical model. Thus, an output of the random walks with restarts algorithm may include a distribution that includes heavier weights for points closer to the origin of the graphical model. A belief propagation algorithm may involve performing inferences with respect to graphical models. The graphical models can include Bayesian networks, Markov random fields, and the like. For example, the belief propagation algorithm can calculate or otherwise determine marginal distributions for each unobserved node in the graphical model based on each observed node in the graphical model. The belief propagation algorithm can exploit a polytree, or directed acyclic graph, graph structure to highly efficiently approximate the unobserved nodes based on the observed nodes of the graphical models.

In some embodiments, to correlate the interactions and attributes with an entity, the hierarchical characterization system initializes a diffusion process. For example, the hierarchical characterization system initializes a PPR algorithm with a random walker distributed over the set of personalization vertices (S), i∈S in which S may be a subset or proper subset of the vertices V of the identity graph. At each time step, with probability 0<c<1, the random walker may randomly move to a neighboring vertex of its current vertex with probability c. Otherwise, the random walker teleports back to one of the personalization vertices with probability 1−c. This random process can define a discrete time Markov Chain. The steady-state probability distribution, p for this Markov Chain may obey the following:

$$p = cW^T D^{-1} p + (1-c)x \quad (1)$$

where x is the average of canonical basis vectors associated with each personalization vertex ($x = 1/|S| \Sigma_{i \in S} x_i$ and $x_i[j]=1$ if i=j, else 0), W is the (possibly weighted) adjacency matrix ($W_{ij} = w_{ij}$), and D is the diagonal matrix of vertex out-degrees ($D_{ii} = \Sigma_{j \in V} w_{ij}$).

The steady state probability distribution p may indicate a fraction of time the random walker will spend at each vertex, providing a robust measure of each vertex's "closeness" to the set of personalization vertices. As a result of the non-zero probability of jumping back to the set of personalization vertices, the distribution may be largest for vertices which are within the well-connected portion of the graph surrounding the personalization vertex, which may correspond to the entity's true identity.

The hierarchical characterization system can characterize the set of interactions and associated identity attributes within the identity footprint of an entity. For example, the hierarchical characterization system determines a canonical vector (e.g., a PPR vector) for each interaction node. Based on the PPR vector, the hierarchical characterization system determines a value indicating a strength of connection or importance between the interaction node and the entity (e.g., if the interaction data for a given online interaction is strongly correlated with multiple attributes associated with the entity, the value is relatively high for that interaction, and if the interaction data for a given online interaction is weakly correlated with one attribute associated with the entity, the value is relatively low for that interaction). This value may be the probability or logarithm of the probability associated with that interaction. For example, as illustrated in FIG. 7, values including probabilities 704 and logarithmic probabilities 708 are shown for a set of interactions 702. These values can be used to associate an interaction (and corresponding attributes) with a particular entity. For example, using the data illustrated in FIG. 7, logarithmic probabilities 708 with values greater than −2.2 are associated with Entity A, logarithmic probabilities 708 with values between −2.2 and −4 are associated with Entity B, and logarithmic probabilities 708 with values less than −4 are associated with Entity C.

The hierarchical characterization system may characterize each interaction as being conducted by a particular entity (e.g., a primary entity in a given identity graph that is associated with most of the interactions and/or attributes), by an associated entity, or by a non-associated entity. The associated entity may be a person the entity knows, such as a family member or coworker, who may share an attribute with the entity, such as a physical address or phone number. The non-associated entity may include a person who previously used an attribute associated with the entity, such as a person who previously resided at the current address of the entity.

The PPR vector may be large for most of the interactions associated with the entity, moderately large for the associated entities, and small for the majority of non-associated entities. Thus, for values over an upper threshold, the PPR vector may indicate that an interaction was conducted by the entity; for values between the upper threshold and a lower threshold, the PPR vector may indicate that the interaction was conducted by the associated entity; and for values below the lower threshold, the PPR vector may indicate that the interaction was conducted by the non-associated entity. The PPR algorithm may provide a hierarchy of identity footprints for any given entity with the scope defined by the selected threshold on the PPR vector. This notion of closeness can be robust to non-unique identity elements, such as large shared addresses, which may imply very little relationship in the absence of other connections.

Computation of the PPR vector may include a collection of an entire connected component, such as the identity graph, that includes the personalization vertex. The entire connected component can be very large, for example over tens of billions of vertices. The PPR value for the vast majority of the vertices may be zero or at least effectively zero since the random walker may be extremely unlikely to visit distant portions of the graph. Accordingly, in order to provide for efficient computation, RPPR can be utilized as a highly efficient approximation of PPR. In some examples, the power method iteration may be initialized on a local neighborhood of the personalization vertex. During the iteration, vertices with rankings above a small threshold are expanded to include neighboring vertices. As a result, only the relevant local neighborhood of the identity of the entity may be explored at query time. The RPPR algorithm may involve approximating the random walk algorithm without directly computing probabilities for each node of the identity graph. For example, the number of vertices traversed using RPPR is on the order of hundreds of vertices, whereas the number of vertices traversed using PPR is on the order of billions of vertices. As a result, the techniques described herein including use of RPPR and a personalized identity graph can provide a reduction in computational cost on the order of 1 million times. The compute time can be reduced from more than a day to about 100 milliseconds. Accordingly, the techniques described herein can generate a report upon receiving a request in less than a second.

The local nature of the computation involved in RPPR and other similar random walk or diffusion algorithms can support rapid characterization of an identity hierarchy of an entity at retrieval time given one or more input keys (e.g. email, phone, device ID, etc.). The graph data may be hosted in its raw form in a low-latency graph database, or other suitable database, which may support rapid point entry and traversals (e.g. key-value storage of the edges in both directions). Thus, in some implementations, the identity graph can be generated substantially in real-time.

At block 608, the hierarchical characterization system 140 generates a report indicating an identity of the entity and a behavior of the entity. The report can be generated based on the correlated online interactions and the correlated attributes. Once the set of interactions and identity elements associated with the entity have been identified using the diffusion process, data processing techniques can be applied to quickly extract data from the identity graph to answer various questions about the identity and behavior of the entity.

In some implementations, the hierarchical characterization system 140 uses the correlations determined at block 606 and shown in FIG. 4 to generate the report. The report may include one or more attributes and/or interactions identified to have been conducted by the entity. The identity of the entity can be indicated by providing a set of identity information. Identity information may include attributes associated with the entity, such as a name of the entity, a primary email address and phone number of the entity, current and past physical addresses of the entity, devices associated with the entity, payment methods associated with the entity, etc. In some examples, responsive to the request for the identity data, the hierarchical characterization system 140 can provide the report to a computing device as output in real time. In some implementations, the system discards the interactions determined to have been conducted by other persons. Alternatively, interactions associated with other entities may be included (e.g., to show information about family members or other entities with some link to the entity).

In some examples, the hierarchical characterization system 140 can infer a set of historical events associated with the entity. The set of historical events can include one or more online interactions. Additionally, the hierarchical characterization system 140 can determine whether the set of historical events includes an anomaly or other suspicious activity.

In some embodiments, the hierarchical characterization system 140 can determine behavior information relating to one or more entities. The behavior information may include one or more interactions associated with the entity, a number of views associated with a post made by the entity, a profit margin of historical purchases made by the entity, a velocity of previous events (e.g., financial transaction events, login events, account creation events, account change events, media download events, media upload events, etc.), purchasing preferences, fraudulent or suspicious events, promotional or free-trial abuse, abuse of terms of service, return policy abuse, some other behavioral attribute, or a combination thereof. The hierarchical characterization system 140 can generate, using the identity graph 400, input features that can be used in one or more predictive algorithms. The input features can be used by the predictive algorithms to determine behavior of the entities. For example, the input features can indicate that an entity frequently abuses discount codes. In this example, the predictive algorithm can output this behavior, and the hierarchical characterization system 140 can display the behavior for viewing by an operator or other suitable individual associated with the hierarchical characterization system 140. In some examples, the hierarchical characterization system 140 can include and/or use the predictive algorithm. Additionally, the hierarchical characterization system 140 or another suitable system associated with the hierarchical characterization system 140, may use the output from the predictive algorithms to detect anomalous behavior, such as by a fraudulent actor impersonating the entity, or to predict future behavior of the entity.

In some embodiments, based on the correlated online interactions and the correlated attributes, the hierarchical characterization system identifies a pattern of behavior of the entity and/or predicts a future behavior of the entity that is malicious. For example, the entity has previously conducted a fraudulent transaction, hacked into a secure data store, or the like. Based on such a determination, the hierarchical characterization system can execute an action to prevent the entity from accessing a computing resource. For example, the hierarchical characterization system can prevent the entity from logging into a secure website, decline a transaction, add the entity to a blacklist thereby causing another computing device to prevent the entity from accessing a computing resource such as a secure website or database, or other actions to prevent the entity from accessing a computing resource.

Exemplary Results of a Diffusion Algorithm

FIG. 7 is a table 700 of online interactions 702 and associated probabilities 704 with respect to a diffusion algorithm performed by a hierarchical characterization system 104 according to one example of the present disclosure. The table 700 can be generated by the hierarchical characterization system 140 using input such as an online transaction event, an interaction attribute associated with the online interaction event, an attribute associated with an entity, or other suitable input. The table 700 can include the online interactions 702, the probabilities 704, interaction attributes 706a-f, and logarithmic probabilities 708 associated with the input.

As illustrated in FIG. 7, each online interaction 702 can include an associated probability 704. The probability 704 can indicate an amount of time, percentage of time, or other suitable measure, that a random walker will be on or in contact with the associated online interaction 702. A larger probability 704 may indicate that the associated online interaction 702 is closer to, or more closely associated, with the input used to generate the table 700. In contrast, a smaller probability 704 may indicate that the associated online interaction 702 is further from, or less closely associated, with the input used to generate the table 700.

As illustrated in FIG. 7, the table 700 includes a first online interaction 710a ("T_04"), a second online interaction 710b ("T_17"), and a third online interaction 710c ("T_49"). The online interactions 710a-c may correspond to probabilities 712a-c. The probability 712a may be larger than the probability 712b, which may be larger than the probability 712c. Accordingly, since the probability 712a is the largest, the hierarchical characterization system 140 may associate the first online interaction 710a with an entity, may associate the second online interaction 710b with an associated entity, and may associate the third online interaction 710c with a non-associated entity. Based on the probabilities or logarithms thereof, an interaction can be associated with a corresponding entity.

Computing System Example

Figure 8:
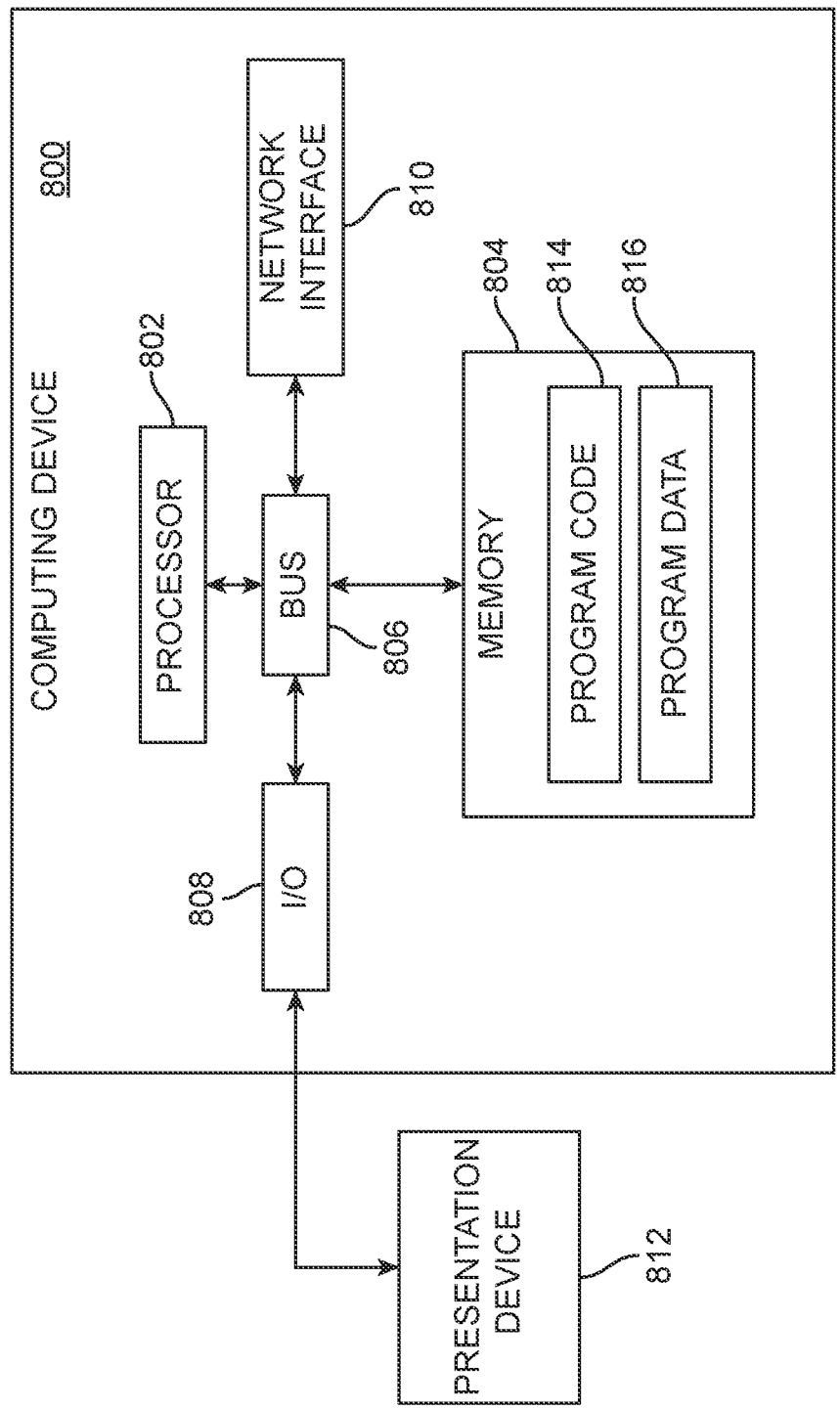
FIG. 8 is a block diagram of a computing system suitable for implementing aspects of the techniques and technologies presented herein.

Any suitable computing system or group of computing systems can be used to perform the operations described herein. For example, FIG. 8 is a block diagram depicting an example of a computing system 800 that can be used to implement one or more of the systems depicted in FIG. 1 (e.g., the hierarchical characterization system 140, etc.). The example of the computing system 800 can include various devices for communicating with other devices in the system environment 100, as described with respect to FIG. 1. The computing system 800 can include various devices for performing one or more of the operations described above.

The computing system 800 can include a processor 802, which can include one or more devices or hardware components communicatively coupled to a memory 804. The processor 802 can execute computer-executable program code 805 stored in the memory 804, can access program data 807 stored in the memory 804, or a combination thereof. Examples of a processor 802 may include a microprocessor, an application-specific integrated circuit (ASIC), a field-programmable gate array (FPGA), or other suitable processing device. The processor 802 can include any number of processing devices, including one. The processor 802 can include or communicate with a memory 804. The memory 804 can store program code that, when executed by the processor 802, causes the processor to perform the operations described in this disclosure.

The memory 804 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The computing system 800 can execute program code 805. The program code 805 may be stored in any suitable computer-readable medium, and may be executed on any suitable processing device. For example, as depicted in FIG. 8, the program code for the hierarchical characterization system 140 can reside in the memory 804 at the computing system 800. Executing the program code 805 can configure the processor 802 to perform one or more of the operations described herein.

Program code 805 stored in a memory 804 may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, and network transmission, among others. Examples of the program code 805 include one or more of the applications, engines, or sets of program code described herein, such as the online interaction logger 210, the characterization module 230, etc.

Examples of program data 807 stored in a memory 804 may include one or more databases, one or more other data structures, datasets, etc. For instance, the memory 804 may include the knowledge graph database 220, or other similar or suitable database, data structure, or dataset.

The computing system 800 may also include a number of external or internal devices such as input or output devices. For example, the computing system 800 is shown with an input/output interface 808 that can receive input from input devices or provide output to output devices. A bus 806 can also be included in the computing system 800. The bus 806 can communicatively couple one or more components of the computing system 800.

In some aspects, the computing system 800 can include one or more output devices. One example of an output device is the network interface device 810 depicted in FIG. 8. A network interface device 810 can include any device or group of devices suitable for establishing a wired or wireless data connection to one or more data networks (e.g., the network 120). Examples of the network interface device 810 can include an Ethernet network adapter, a modem, etc. Another example of an output device can include a presentation device 812. The presentation device 812 can include any device or group of devices suitable for providing visual, auditory, or other suitable sensory output. Examples of the presentation device 812 may include a touchscreen, a monitor, a speaker, a separate mobile computing device, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A computer-implemented method comprising:
   receiving, by a computing system from a computing device, a first attribute and a request for associated identity data;
   responsive to the request, generating, by the computing system, an identity graph comprising a plurality of attribute nodes corresponding to a respective plurality of attributes and a plurality of online interaction nodes corresponding to a respective plurality of online interactions, the attribute nodes including an attribute node corresponding to the first attribute;
   based on the identity graph, correlating, by the computing system, at least a subset of the plurality of online interactions and at least a subset of the plurality of attributes with a particular entity, wherein the correlating comprises executing a diffusion process on the identity graph to compute a probability distribution for each of the online interactions; and
   generating, by the computing system based on the correlated online interactions and the correlated attributes, a report indicating an identity of the particular entity and a behavior of the particular entity.

2. The method of claim 1, further comprising:
   responsive to the request for the identity data, providing the report to the computing device as output.

3. The method of claim 1, further comprising: based on the correlated online interactions and the correlated attributes, executing an action to prevent the particular entity from accessing a computing resource.

4. The method of claim 1, wherein the diffusion process comprises one or more of:
   personalized page rank;
   restricted personalized page rank;
   random walks with restarts;
   a variant of belief propagation; or
   lazy random walks.

5. The method of claim 1, wherein the identity graph comprises a bipartite graph.

6. The method of claim 1, wherein the particular entity is a first entity, and wherein generating the report indicating the identity and the behavior of the first entity includes determining an identity and a behavior of a second entity that is associated with the first entity.

7. The method of claim 6, further comprising determining one or more projections of future behavior associated with the first entity and the second entity.

8. The method of claim 1, wherein each attribute semi-uniquely identifies the particular entity.

9. The method of claim 1, wherein:
   generating the report indicating the identity and the behavior of the particular entity includes inferring a set of historical events associated with the particular entity, wherein the set of historical events includes one or more online interactions; and
   generating the report indicating the identity and the behavior of the particular entity includes determining whether the set of historical events includes an anomaly.

10. A system comprising:
    a processor; and
    a non-transitory computer-readable medium comprising instructions that are executable by the processor to cause the processor to perform operations comprising:
    receiving, by a computing system from a computing device, a first attribute and a request for associated identity data;
    responsive to the request, generating, by the computing system, an identity graph comprising a plurality of attribute nodes corresponding to a respective plurality of attributes and a plurality of online interaction nodes corresponding to a respective plurality of online interactions, the attribute nodes including an attribute node corresponding to the first attribute;

based on the identity graph, correlating, by the computing system, at least a subset of the plurality of online interactions and at least a subset the plurality of attributes with a particular entity, wherein the correlating comprises executing a diffusion process on the identity graph to compute a probability distribution for each of the online interactions; and generating, by the computing system based on the correlated online interactions and the correlated attributes, a report indicating an identity of the particular entity and a behavior of the particular entity.

11. The system of claim 10, wherein the operations further comprise:

responsive to the request for the identity data, providing the report to the computing device as output.

12. The system of claim 10, wherein the identity graph comprises a bipartite graph, and wherein the diffusion process comprises one or more of:

personalized page rank;
restricted personalized page rank;
random walks with restarts;
a variant of belief propagation; or
lazy random walks.

13. The system of claim 10, wherein the particular entity is a first entity, and wherein the operation of generating the report indicating the identity and the behavior of the first entity includes determining an identity and a behavior of a second entity that is associated with the first entity, and wherein the operations further comprise determining one or more projections of future behavior associated with the first entity and the second entity.

14. The system of claim 10, wherein each attribute semi-uniquely identifies the particular entity.

15. The system of claim 10, wherein:

the operation of generating the report indicating the identity and the behavior of the particular entity includes inferring a set of historical events associated with the particular entity, wherein the set of historical events includes one or more online interactions; and the operation of generating the report indicating the identity and the behavior of the particular entity includes determining whether the set of historical events includes an anomaly.

16. A non-transitory computer-readable storage medium having program code that is executable by a processor device to cause a computing device to perform operations, the operations comprising:

receiving, by a computing system from a computing device, a first attribute and a request for associated identity data;

responsive to the request, generating, by the computing system, an identity graph comprising a plurality of attribute nodes corresponding to a respective plurality of attributes and a plurality of online interaction nodes corresponding to a respective plurality of online interactions, the attribute nodes including an attribute node corresponding to the first attribute;

based on the identity graph, correlating, by the computing system, at least a subset of the plurality of online interactions and at least a subset the plurality of attributes with a particular entity, wherein the correlating comprises executing a diffusion process on the identity graph to compute a probability distribution for each of the online interactions; and generating, by the computing system based on the correlated online interactions and the correlated attributes, a report indicating an identity of the particular entity and a behavior of the particular entity.

17. The non-transitory computer-readable storage medium of claim 16, wherein the operations further comprise:

responsive to the request for the identity data, providing the report to the computing device as output.

18. The non-transitory computer-readable storage medium of claim 16, wherein the identity graph comprises a bipartite graph, and wherein the diffusion process comprises one or more of:

personalized page rank;
restricted personalized page rank;
random walks with restarts;
a variant of belief propagation; or
lazy random walks.

19. The non-transitory computer-readable storage medium of claim 16 wherein:

each attribute semi-uniquely identifies the particular entity;

the operation of generating the report indicating the identity and the behavior of the particular entity includes inferring a set of historical events associated with the particular entity, wherein the set of historical events includes one or more online interactions; and the operation of generating the report indicating the identity and the behavior of the particular entity includes determining whether the set of historical events includes an anomaly.

* * * * *